United States Patent Office 3,627,532
Patented Dec. 14, 1971

3,627,532
PHOTOGRAPHIC ELEMENT INCLUDING A PYRAZOLINE LIGHT SCREENING COLLOID COMPOSITION
Henri Depoorter, Mortsel, Guy Alfred Rillaers, Kontich, Felix Jan Moelants, Wilrijk, and Theofiel Hubert Ghys, Kontich, Belgium, assignors to Gevaert-Agfa N.V., Mortsel, Belgium
Filed Oct. 9, 1969, Ser. No. 864,977
Claims priority, application Great Britain, Nov. 7, 1963, 52,876/68
Int. Cl. G03c 1/84; F21v 9/00
U.S. Cl. 96—84          12 Claims

ABSTRACT OF THE DISCLOSURE

Colloid compositions comprising a hydrophilic colloid and a 4-[(2- or 3-pyrrolyl)-methylene]-2-pyrazoline-5-one dye carrying at least one member of the group consisting of carboxyl group and sulpho group in acid or salt form are described. These colloid compositions are useful in light-sensitive photographic elements.

---

Figure 1:
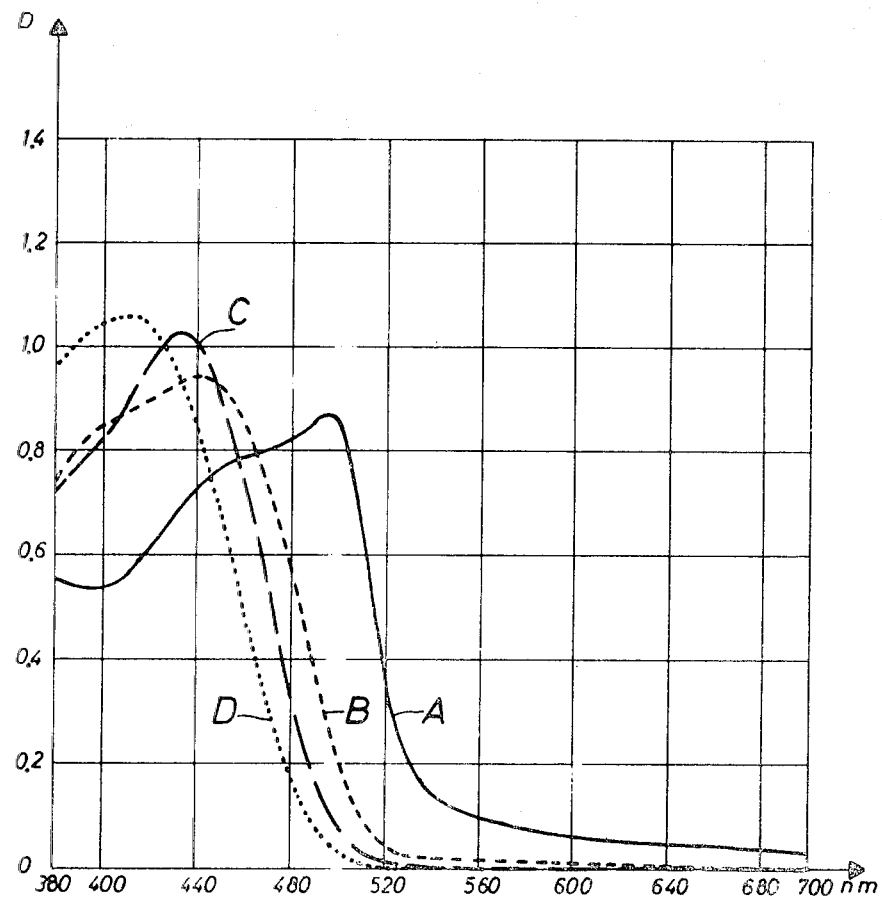

The present invention relates to novel light-screening methine dyes for use in photographic elements and to photographic elements containing said dyes.

It is known, for many purposes, to incorporate light-screening dyes into photographic elements. Such a light-screening dye may be used as filter dye in a layer coated over one or more light-sensitive emulsion layers or between two emulsion layers e.g. differently colour-sensitized emulsion layers to protect the underlying light-sensitive emulsion layer(s) from the action of light of wavelength absorbed by such light-screening dye or it may be used as screening dye in a light-sensitive emulsion layer for the purpose of modifying a light record in such emulsion layer or it may be used as antihalation dye in a layer not containing a light-sensitive substance known as antihalation layer situated on either side of the support carrying the light-sensitive emulsion layer(s).

Light-screening dyes should meet severe demands in order to be useful in photographic elements. They should have good absorption characteristics and should not give rise to fogging. They should be readily rendered ineffective, i.e., decolourised or destroyed and removed in at least one of the photographic processing liquids. Further they should not affect the inherent sensitivity or spectral sensitivity of light-sensitive emulsions with which they come into contact.

Numerous compounds have been employed as light-screening dyes for the purposes given above, but many are unsuitable because they do not meet all of the above demands. For instance, it has been proposed to use as light-screening dyes bispyrrole cyanine dye salts, but these dye salts are not always useful as light-screening dyes owing to the fact that these dyes containing a pyrrole nucleus have a marked desensitizing effect on the silver halide material.

It has now been found that, contrary to what could be expected, 4-[(2- or 3-pyrrolyl)-methylene]-2-pyrazoline-5-one dyes carrying at least one carboxyl or sulpho group in acid or salt form have no desensitizing effect on light-sensitive emulsions and are particularly suitable for use as filter dyes and antihalation dyes in photographic non-light-sensitive colloid layers and as screening dyes in photographic light-sensitive emulsion layers since they also meet all other demands that are made on light-screening dyes.

Thus, in accordance with the present invention 4-[(2- or 3-pyrrolyl)-methylene]-2-pyrazoline-5-one dyes are provided for use as novel light-screening dyes in hydrophilic colloid layers.

More particularly, in accordance with the present invention 4-[(2- or 3-pyrrolyl)-methylene]-2-pyrazoline-5-one dyes are provided for use as light-screening dyes in hydrophilic colloid layers, which dyes correspond to the following general formula I.

I 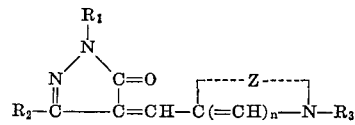

wherein:
each of $R_1$ and $R_3$ (the same or different) stands for hydrogen, alkyl including substituted alkyl, aralkyl including substituted aralkyl, aryl including substituted aryl, allyl or cycloalkyl,
$R_2$ stands for alkyl including substituted alkyl, aralkyl including substituted aralkyl, carboxyl, alkoxycarbonyl, or aryl including substituted aryl,
Z represents the atoms necessary to close a pyrrole nucleus including a substituted pyrrole nucleus, e.g. pyrrole substituted by one or more alkyl groups including substituted alkyl groups, preferably comprising at most 8 C-atoms, allyl groups, aryl groups including substituted aryl groups, carboxyl groups and alkoxycarbonyl groups, and
$n$ stands for 0 or 1, the dyestuff molecule containing at least one carboxyl or sulpho group in acid or salt form e.g. as alkali-metal salt, ammonium salt, alkaline-earth metal salt, organic amine such as pyridine salt, etc.

By appropriate choice of the substituents the characteristics of the novel light-screening dyes of the invention as regards absorption range, solubility and fastness to diffusion can be adapted to the necessities.

The dyes of use according to the present invention meet the severe demands that are made on antihalation dyes, filter dyes and screening dyes for photographic silver halide materials, in other words, they do not desensitize or fog a light-sensitive silver halide emulsion, are well miscible with a photographic colloid, e.g. gelatin, can easily be incorporated into the photographic material, possess an intensive tinctorial power and are discharged quickly, completely and irreversibly without formation of coloured degradation products in alkaline or acid reducing mediums such as alkaline photographic developing baths.

The following are representative screening dyes of use according to the present invention. However it is to be understood that the invention is not limited to these specific screening dyes.

1. 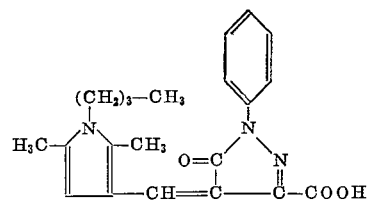

2. 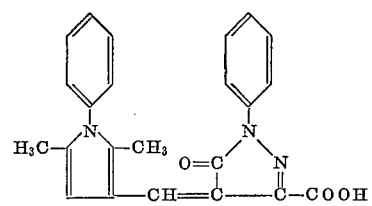

3.
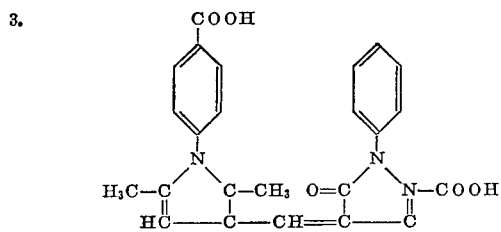

4.
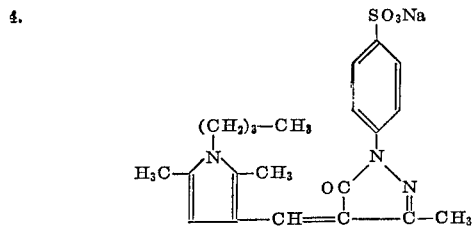

5.
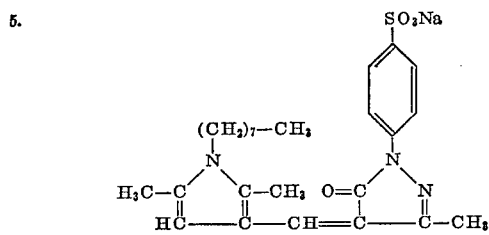

6.
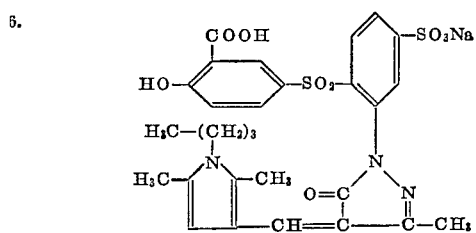

7.
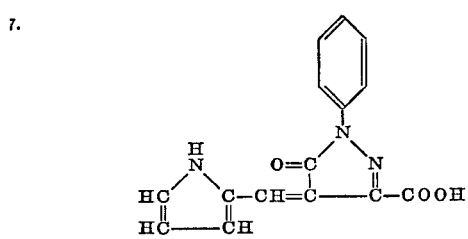

8.
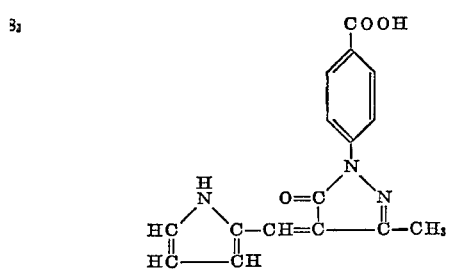

9.
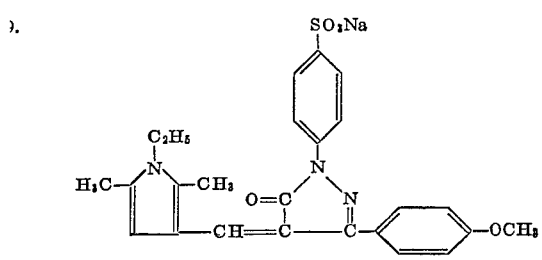

10.
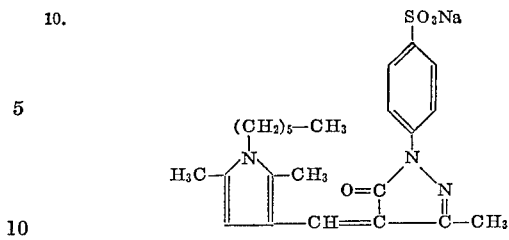

As is illustrated by means of the following preparations the dyes according to the present invention can be prepared by reaction of a 2- or 3-pyrrolecarboxaldehyde with the appropriate 2-pyrazoline-5-one having a reactive methylene group in the 4-position.

PREPARATION 1

The dye corresponding to the above Formula 2 was prepared as follows:

A mixture of 9.3 g. of 1-phenyl-3-carboxy-2-pyrazolin-5-one and 9 g. of 1-phenyl-2,5-dimethyl-3-formyl-pyrrole was boiled, with stirring, for 30 minutes in 100 ml. of ethylene glycol monomethyl ether. The resulting solution was cooled overnight whereupon the dye that had crystallized was filtered off, washed with propanol and ether and then dried in vacuum. Yield: 12.3 g. (71%). Melting point: 240° C.

The dyes corresponding to the above Formulae 1, 3, 7 and 8 were prepared in an analogous way.

PREPARATION 2

The dye according to the above Formula 5 was prepared as follows:

4.7 g. of 1-n-octyl-2,5-dimethyl-3-formyl-pyrrole, 5.4 g. of 1-p-sulphophenyl-3-methyl-2-pyrazolin-5-one and 2.8 g. of crystallized sodium acetate were boiled, with stirring, for 3 hours in 90 ml. of ethylene glycol monomethyl ether. The solution formed was evaporated in vacuum to dryness and the residue was recrystallized from ethanol. Yield: 2.5 g. (25%).

The dyes corresponding to the above Formulae 4, 6, 9 and 10 were obtained in a similar way.

The absorption characteristics (in methanol of the dyes prepared are listed in the following table. In the table and hereinafter in the specification, nm designates a nanometer which is the international unit of measurement equal to $10^{-9}$ meters.

| Dyestuff of formula: | Absorption maximum nm. | $\epsilon \cdot 10^{-4}$ |
|---|---|---|
| 1 | 450 | 2.62 |
| 2 | 450 | 2.54 |
| 3 | 440 | 1.67 |
| 4 | 415 | 1.97 |
| 5 | 415 | 2.22 |
| 6 | 430 | 1.34 |
| 7 | 394 | 2.25 |
| 8 | 395 | 3.15 |
| 9 | 416 | 2.15 |
| 10 | 413 | 2.27 |

The 2-pyrazolin-5-ones with reactive methylene group in the 4-position for use in the preparation of the dyes according to the present invention can be prepared by methods well known in organic chemistry.

The formylpyrroles of use in the preparation of the dyes according to the present invention can be prepared by a Vilsmeier-Haack formulation of the corresponding pyrroles according to the method described by R. Silverstein et al., Organic Synthesis, Coll. vol. IV, 831, for the preparation of 2-formylpyrrole. However, 1-p-carboxyphenyl-2,5-dimethyl-3-formylpyrrole was obtained by hydrolysis of 1-p-ethoxycarbonylphenyl - 2,5 - dimethyl-3-formylpyrrole as described in the following preparation.

PREPARATION 3

77.7 g. of 1-p-ethoxycarbonylphenyl-2,5-dimethyl-3-formylpyrrole were dissolved in 860 ml. of ethanol. At a temperature of 50–60° C., 431 ml. of 2 N sodium hydroxide were added dropwise and the mixture was then stirred at the same temperature for 3 hours. The reaction mixture was evaporated in vacuum whereupon the residue was diluted with water to 400 ml. The carboxy compound was precipitated by carfully acidifying the solution with stirring, by means of 2 N hydrochloric acid. The precipitate was filtered off and dried. Yield: 47.5 g. (69%). Melting point: 242° C.

The pyrroles can be prepared by methods well known in organic chemistry. For instance the 1-substituted 2,5-dimethyl pyrroles can be prepared by condensing a primary amine with acetonylacetone according to the procedure described by D. Nightingale et al., J. Org. Chem., 25 (1959) 504 for the preparation of 1-butyl-2,5-dimethyl-pyrrole.

The dyes according to the present invention can also be prepared by reaction of the appropriately substituted pyrrole compound with a 2-pyrazolin-5-one corresponding to the formula:

II

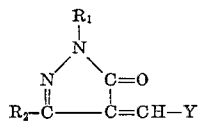

wherein $R_1$ and $R_2$ have the same significance as above and Y stands for hydroxy, alkoxy, e.g. ethoxy or anilino.

These reactions can be carried out by heating the reaction compounds in the presence of a basic condensing agent such as sodium acetate or pyridine. The reactions can also occur in an inert diluent such as methanol, ethanol, ethylene glycol monomethyl ether, acetonitrile, dimethylsulphoxide, tetrahydrothiophene-1,1-dioxide or dimethyl formamide, either or not in the presence of a basic condensing agent.

The 2-pyrrazolin-5-ones corresponding to Formula II can be prepared by methods well known in polymethine dye synthesis.

The dyestuffs according to the invention can be applied in any photographic material based on light-sensitive silver halide, when easily dischargeable dyestuffs are desired or necessary. Examples of applications of these dyes are: in an antihalation layer e.g. between the support and a light-sensitive silver halide emulsion layer or at the backside of the support, in a filter layer above or between the light-sensitive silver halide emulsion layers or as screening dye in a light-sensitive layer. Said dyestuffs when used as screening dye in a light-sensitive silver halide emulsion layer do not or practically do not decrease the inherent and/or spectral sensitivity of the silver halide.

The dyes according to the present invention can be incorporated into a photographic material according to any technique known to those skilled in the art. The following is a mere description of some appropriate techniques and has no intention of limiting the scope of the invention.

An alkali salt of a dye according to the present invention is dissolved in water, whereupon the solution obtained is dispersed, occasionally in the presence of a wetting agent, in a hydrophilic colloid composition, preferably a gelatin solution. With a mixture so obtained, layers can be coated in which the dyes are not fast to diffusion unless the said dyes contain a long-chain alkyl group.

Layer with broad spectral absorption in which the dyes are fast to diffusion, can be obtained, provided the dyes contain only carboxyl groups and no sulphonic acid groups, when equivalent amounts in respect of the said carboxyl groups of a water-soluble acid, e.g., hydrochloric acid or acetic acid, or equivalent amounts of a water-soluble salt, which forms water-insoluble salts with the dye, e.g. silver nitrate or lead nitrate, are added to the hydrophilic colloid composition before, during or after the addition of the aqueous solution of the alkali salts of the dyes.

The dyes according to the present invention that are difficultly soluble in water can also be incorporated in a form fast to diffusion and with broad spectral absorption, when using a dispersion of said dye in a hydrophilic colloid, obtained in one of the following ways:

(a) A solution of the dye in a suitable organic water-miscible and/or water-immiscible solvent, is dispersed in a hydrophilic colloid solution, preferably an aqueous gelatin solution, occasionally in the presence of a wetting agent. For more details about such dispersing techniques, there can be referred to United Kingdom patent specifications 791,219, 1,099,414, 1,099,415, 1,099,416, 1,099,417 and 1,098,594, to United Kingdom patent application 48,614/66 and to United States patent specification 2,304,940.

(b) A suspension of the dye in water is finely ground in a mill, e.g. a colloid ball mill, occasionally in the presence of a wetting agent; the hydrophilic colloid can be added before or after the milling process, (c) Difficultly water-soluble dyes comprising carboxyl or sulpho groups are dissolved in the form of their alkali metal salts in a water-immiscible solvent whereupon the solution is dispersed in water or aqueous hydrophilic colloid and the solvent is removed. The resulting solution is then admixed with the hydrophilic colloid coating composition. For more details about the technique just described there can be referred to United Kingdom patent application 46,459/67.

In order to disminish the diffusion tendency of the dyes according to the present application towards adjacent layers it is further possible, as known in the art, to add polymer mordanting agents to the hydrophilic colloid compositions.

Examples of such agents are:

poly-N,N-diethylamino-ethylmethacrylate as described in United States patent specification 2,675,316 and United Kingdom patent specification 685,475;
poly-4-vinylpyridine as described in United States patent specification 2,606,834 and United Kingdom patent specification 678,595;
the copolymer of cyclodiallylamine and sulphur dioxide as described in United Kingdom patent application 47,310/67;
poly-2-vinyl-3,4,5,6-tetrahydro-pyrimidine as described in United Kingdom patent application 14,522/68;
polyethyleneimine as described in German patent specification 928,268.

Other very suitable mordanting polymers are:

poly(2-hydroxy-3-methacryloyloxypropyl-trimethyl-ammonium chloride)
the copolymer of acrylic acid and 2-hydroxy-3-methacryloyloxypropyl-trimethylammonium chloride, and
poly-β-aminoethyl acrylate, described in Belgian patent specification 656,266.

The colloids or mixtures of colloids used in the hydrophilic colloid compositions, into which the dyes are incorporated, may be of any type as commonly used in photographic materials, e.g. gelatin, casein, polyvinyl alcohol, poly-N-vinyl pyrrolidone, carboxymethylcellulose, sodium alginate, etc., gelatin being however favoured. Before coating, other ingredients, such as coating aids and hardening agents, may be added to the dye-containing coating compositions.

The following example illustrates more particularly the use of the dyes according to the present invention.

Example

A series of coating solutions of the following composition are prepared:

inert gelatin—100 g.
saponine—2.5 g.
formaldehyde (4% aqueous solution)—2.5 ml.
dyestuff (added from a solution or dispersion as listed in the table below in the given concentration)
water to make 1000 ml.

The coating solutions having a pH-value as listed in the table below are coated to form an antihalation layer on subbed cellulose triacetate supports pro rata of 10 g./sq. m. so that per sq. m. an amount of dye as given in the table is present.

Figure 2:
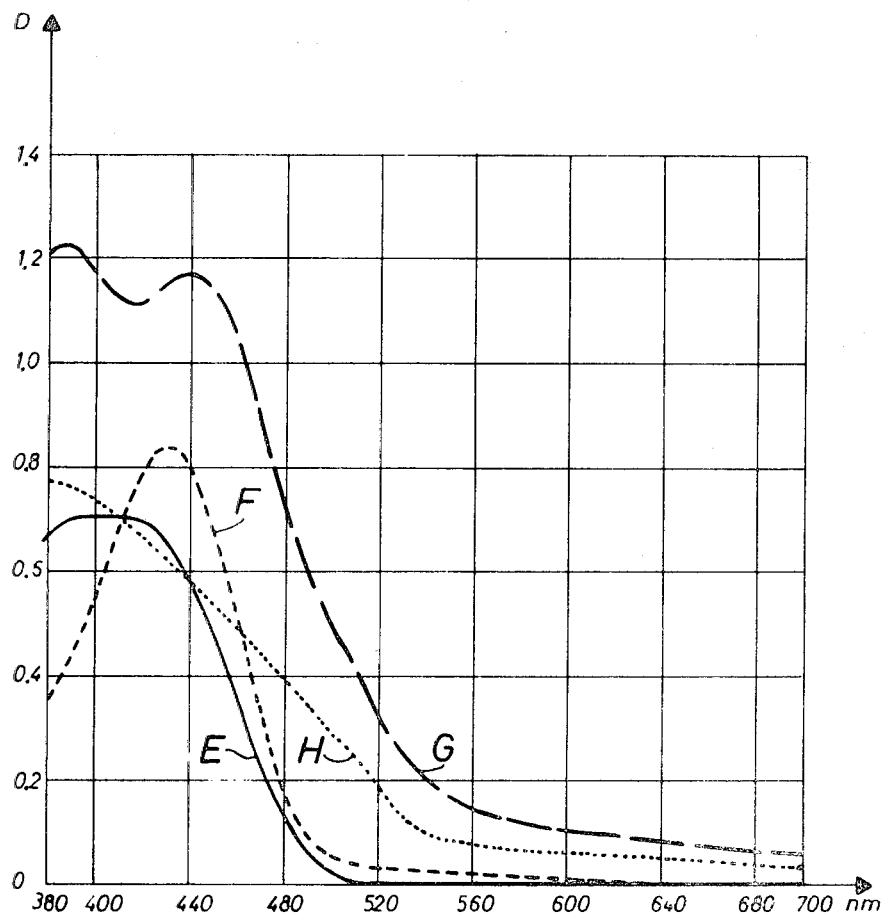
Figure 3:
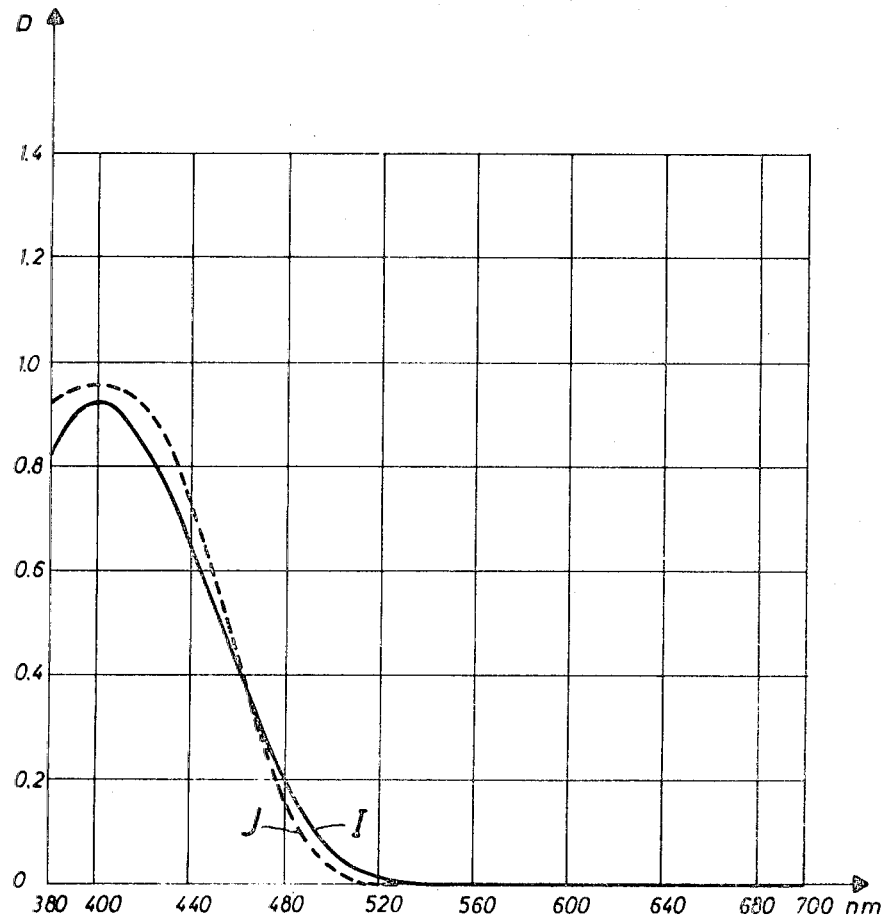

The spectral absorption characteristics of the coloured layers obtained are given in the table below and are represented on the density versus wavelength curves of FIGS. 1, 2 and 3 of the accompanying drawings.

These layers discolour completely during conventional photographic processing.

In the gelatin layers comprising the dyestuffs of Formulae 1, 2 and 5 the dyes are present in a form fast to diffusion.

3-methacryloyloxypropyl-trimethylammonium chloride), the copolymer of acrylic acid and 2-hydroxy-3-methacryloyl-oxypropyl-trimethylammonium chloride and poly-β-aminoethyl acrylate.

8. A colloid composition according to claim 1, disposed in a water-permeable colloid layer of a light-sensitive photographic element.

9. A colloid composition according to claim 8 wherein said hydrophilic colloid is gelatin.

10. A colloid composition according to claim 1, wherein said dye corresponds to the formula:

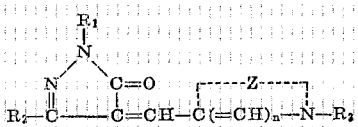

wherein:
each of $R_1$ and $R_3$ stands for hydrogen, an alkyl group, a cycloalkyl group, an aralkyl group, an aryl group, or allyl,
$R_2$ stands for an alkyl group, an aralkyl group, carboxyl, alkoxycarbonyl or an aryl group,
Z represents the atoms necessary to close a pyrrole nucleus, and
$n$ stands for 0 or 1,
the dyestuff molecule containing at least one member of the group consisting of carboxyl and sulpho group in acid or salt form.

11. A colloid composition according to claim 6, wherein in said dye $R_1$ stands for hydrogen, alkyl, aryl, sulphoaryl or carboxyaryl, $R_2$ stands for lower alkyl, carboxy or alkoxycarbonyl, $R_3$ stands for hydrogen, alkyl comprising from 1 to 8 carbon atoms, aryl, sulphoaryl or carboxyaryl, Z stands for the necessary atoms to close a 2-pyrrole ($n=0$), or for the necessary atoms to close a 3-pyrrole or a 2,5-dimethyl-3-pyrrole nucleus ($n=1$), the dyestuff molecule containing at least one member of the group consisting of carboxyl group and sulpho group in acid or salt form.

12. A colloid composition according to claim 10 disposed in a water-permeable colloid layer of a light-sensitive photographic element.

TABLE

| Dyestuff Of formula | Added from— | pH of coating solution | Mg. of dye per sq. m. | λ max., nm. | Optical density | Curves of accompanying drawings |
|---|---|---|---|---|---|---|
| 1 | Dispersion (2.5% by wt.)[1] | 7.0 | 400 | 495 | 0.87 | A |
| 2 | Dispersion (1% by wt.)[1] | 6.3 | 390 | 440 | 0.94 | B |
| 3 | do | 5.9 | 350 | 435 | 1.02 | C |
| 4 | Solution in water (25 g./l.) | 6.0 | 300 | 415 | 1.06 | D |
| 5 | do | 6.0 | 200 | 400 | 0.71 | E |
| 6 | Solution in water/ethanol (1:1) (25 g./l.) | 6.3 | 200 | 430 | 0.44 | F |
| 7 | Dispersion (2.5% by wt.)[1] | 5.9 | 470 | {385, 440} | {1.24, 1.16} | G |
| 8 | do | | 470 | <380 | [2] 0.77 | H |
| 9 | Solution in water (12.5 g./litre) | 6.1 | 250 | 400 | 0.93 | I |
| 10 | Solution in water (25 g./litre) | 6.1 | 250 | 397 | 0.96 | J |

[1] The dispersions are prepared by means of swinging mill—the dyestuffs are dispersed in the concentration given, in 2% aqueous gelatin in the presence of 250 mg. of sodium 2-methyl-2-ethyl-undecane sulphate per 100 ml.
[2] At 380 nm.

We claim:

1. A colloid composition comprising a hydrophilic colloid and a 4-[(2- or 3-pyrrolyl)-methylene]-2-pyrazoline-5-one dye carrying at least one member of the group consisting of carboxyl group and sulpho group in acid or salt form.

2. A colloid composition according to claim 1, disposed in a water-permeable colloid layer shielding at least one optically sensitized silver halide emulsion layer of a light-sensitive photographic multilayer silver halide colour element for the light of wavelength absorbed by the said dye.

3. A colloid composition according to claim 1, disposed in an antihalation layer of a light-sensitive photographic element containing at least one silver halide emulsion layer.

4. A colloid composition according to claim 1, disposed in a silver halide emulsion layer of a light-sensitive photographic element.

5. A colloid composition according to claim 1 wherein said hydrophilic colloid is gelatin.

6. A colloid composition according to claim 1 which includes a polymer mordanting agent.

7. A colloid composition according to claim 6, wherein said mordanting agent is a member selected from the group consisting of poly-N,N-diethylamino-ethylmethacrylate, poly-N-vinylpyridine, the copolymer of cyclodiallylamine and sulphur dioxide, poly-2-vinyl-3,4,5,6-tetrahydropyrimidine, polyethyleneimine, poly(2-hydroxy-

References Cited

UNITED STATES PATENTS 2,274,782  3/1942  Gaspar _____ 96—84

JOHN T. GOOLKASIAN, Primary Examiner

W. E. HOAG, Assistant Examiner

U.S. Cl. X.R.

252—300